G. B. WILLISON.
Mill Bolt.

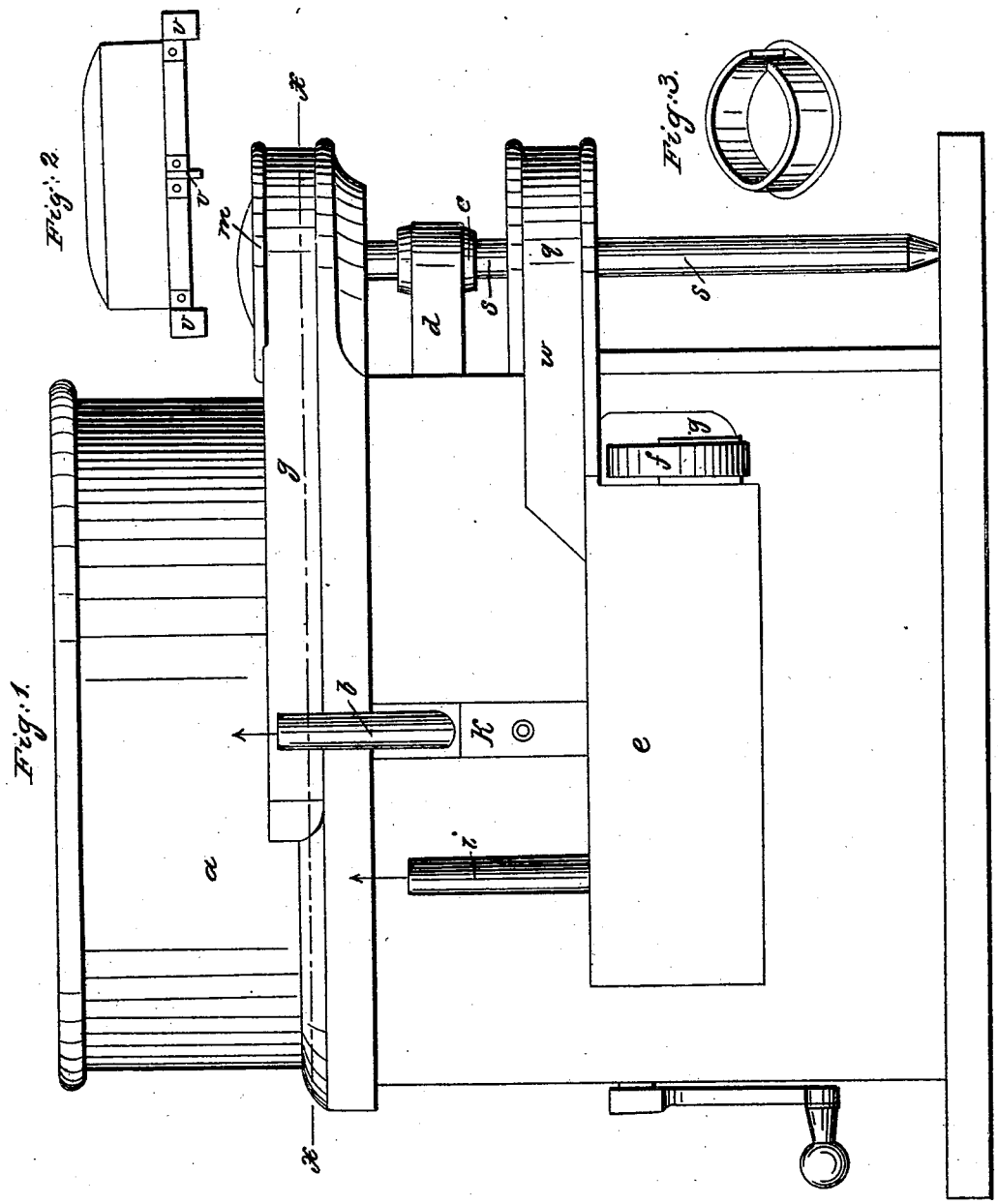

No. 13,192.

2 Sheets—Sheet 2.

Patented July 3, 1855.

Witnesses:
Moses F. Eaton.
R. A. Howard.

Inventor:
George Butler Willison.

UNITED STATES PATENT OFFICE.

GEORGE B. WILLISON, OF ELIZABETH, PENNSYLVANIA.

COOLING AND DRYING FLOUR.

Specification of Letters Patent No. 13,192, dated July 3, 1855.

*To all whom it may concern:*

Be it known that I, GEORGE BUTLER WILLISON, of the borough of Elizabeth, in the county of Allegheny and State of Pennsylvania, have invented a new and useful Improvement in Apparatus for Cooling and Drying Flour; and I do hereby declare that the following is a full and exact description thereof, reference being had to the accompanying drawings, forming part of this specification, in which—

Figure 4:
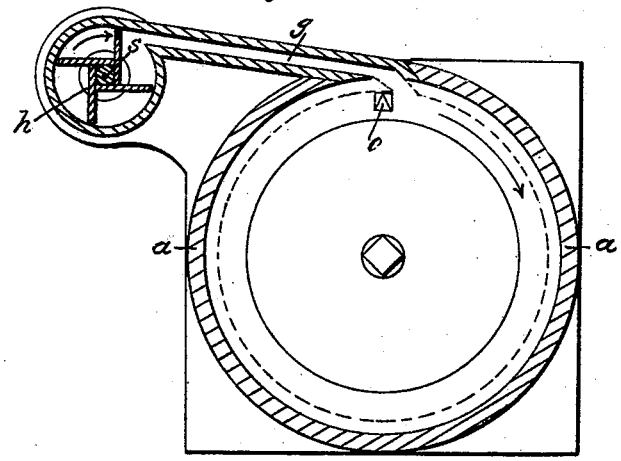
Figure 5:
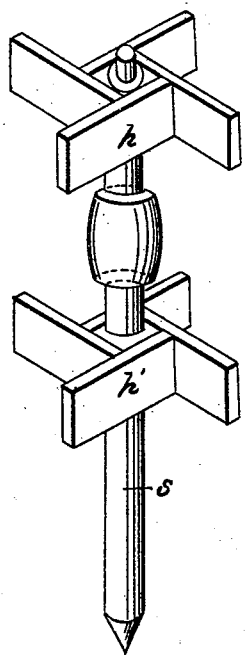
Figure 6:
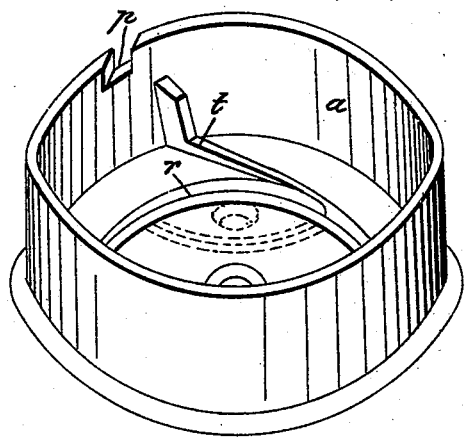

Figure 1 is an elevation of my apparatus as attached to a single run of burs: Fig. 2 is an elevation or side view of the upper stone detached: Fig. 3 is a perspective representation of the cap or covering of the upper fan box: Fig. 4 is a transverse horizontal section through $x$—$x$ (Fig. 1,) Fig. 5 is a perspective view of the fan shaft, Fig. 6 is a perspective view of the interior of the curb or covering of the upper mill stone, turned upside down.

In the several figures like letters of reference denote similar parts of my apparatus.

My invention consists in the application of a draft of cold air over and around the upper mill stone in grist mills, between the curb and the mill stone by means of a fan, and flanges on the inside of the curb to serve as a guide for the air, and cause it to pass around and over the stone, so as to prevent sweat gathering thereon, and to dry and cool the flour, together with the use of ventilators to allow the escape of the hot air and moisture without blowing away the flour.

It is well known fact that in the grinding of flour considerable heat is evolved attended with moisture or sweat. This heat is so considerable that it is found necessary to cool the flour, after it has passed from the burs, by a separate process, in a chamber prepared for the express purpose; but the moisture or sweat which arises from the heated flour, condenses on the stones, and on the sides of the elevators through which the flour has to pass on its way to the cooling chamber. This sweat is not only an injury to the flour itself, but causes the flour to adhere to the moist surface of the stones and elevators, thus causing considerable loss and clogging the passages. My invention is designed to obviate at once both these evils, and thus, not only improve the quality of the flour, but save considerable loss and annoyance.

In the drawing (Fig. 1) $a$ is the curb or covering of the upper mill stone. It is cylindrical in shape, and of such dimensions as to envelop the sides and upper surface of the upper stone, leaving a space for the passage of the air all around and over the stone.

$s$ is a perpendicular shaft which is placed on one side of the lower mill stone, and which is furnished with a fan blower $h$. This shaft turns on its axes, being made to revolve rapidly by a belt passing over a drum $e$ or other gearing communicating motion to it, from the spindle of the burs, or other part of the machinery. This fan $h$ is so placed as to be on a level with the plane of the upper surface of the lower stone, and is covered by a close cap or covering $m$ (see Fig. 3), a channel or pipe $q$, connecting in front of the passage $o$ down which the flour escapes from the stones into the chest $c$ from which it is carried by a screw conveyer to the elevators.

A small opening on the side of the curb (see $p$ Fig. 6) at the mouth of the pipe $q$ admits the current of air formed by the fan blower $h$ into the space between the curb $a$ and the upper mill stone. An annular flange of gum elastic or other suitable material $r$ attached to and projecting from the under surface of the top of the curb (see Fig. 6) which touches the surface of the stone around the hole in the center of the upper mill stone, prevents the current of air from passing down that cavity; and a tangential flange $t$, extending from the circumference of the annular flange $r$ to the side of the curb and thence passing down the side of the curb, so nearly to the base of the curb as merely to allow of the passage under it of the scrapers $v$, $v$, $v$, attached to the circumference of the upper mill stone at its base, and terminating at one side of the opening $p$ (in the curb) which admits the draft serves to give direction to the current of air, and causes it to pass around and over the stone in a regular course, and operate equally on all parts of the surface. The tangential flange $t$ also prevents the current of air from the fan blower $h$ from finding its exit through the passage $o$, until it has passed around the curb and over the stone by forming a barrier between the mouth of the tube $q$ and the passage $o$, so that the air, confined between the tangential flange $t$ and the sides of the curb and the stone, follows the direction of the arrow in Fig. 4 and passes around the sides of the upper stone and over it (outside of the annular flange $r$), until it finds its exit in the passage $o$, and the flour, as it passes from the stones, being agitated by the scrapers $v\ v\ v$ and carried around by them at its exit at $o$, is thus exposed continually to the direct action of the cool air from the fan blower, which carries off the heat and moisture of the flour, and prevents the sweat settling upon the surface of the stone and curb.

As the flour falls through the passage $o$, it is conducted by the pipe $k$ into the chest $c$. A tube or ventilator $c$ rising from the pipe $k$ serves as a vent for the escape of the air from the fan blower $h$, charged with the heat and moisture derived from the flour. An additional fan may be added on the same fan shaft (as shown in the drawings) still further to cool the flour after it passes from the stones, but this I need not particularly describe as I do not claim it as new, in itself, any further than as respects the peculiar arrangement and mode of attaching it, and the use of a ventilating tube $i$ (Fig. 1) to carry off the heated air and moisture similar to the ventilator $l$ already described.

What I claim as my invention and desire to secure by Letters Patent is—

The application of a draft of cold air over and around the upper mill stone in grist mills between the stone and the curb to prevent sweating on the stones and curb, and to cool and dry the flour by means of the fan $h$ in combination with the annular and tangential flanges inside the curb, to serve as a guide for the current of air, and the ventilating tube or tubes in the manner and for the purposes hereinafter set forth.

GEORGE BUTLER WILLISON.

Witnesses:
MOSES F. EATON,
R. A. HOWARD.